United States Patent
Xie et al.

(10) Patent No.: US 10,399,253 B2
(45) Date of Patent: Sep. 3, 2019

(54) METHOD FOR PRODUCING NON-METAL SELF-HEATABLE MOLDS

(71) Applicant: Dow Global Technologies LLC, Midland, MI (US)

(72) Inventors: Demei Xie, Hunan (CN); Liangkai Ma, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 525 days.

(21) Appl. No.: 14/903,317

(22) PCT Filed: Aug. 29, 2013

(86) PCT No.: PCT/CN2013/082531
§ 371 (c)(1),
(2) Date: Jan. 7, 2016

(87) PCT Pub. No.: WO2015/027423
PCT Pub. Date: Mar. 5, 2015

(65) Prior Publication Data
US 2016/0158970 A1 Jun. 9, 2016

(51) Int. Cl.
*B29C 33/40* (2006.01)
*B29C 70/54* (2006.01)
(Continued)

(52) U.S. Cl.
CPC ............ *B29C 33/405* (2013.01); *B29C 33/02* (2013.01); *B29C 33/3828* (2013.01);
(Continued)

(58) Field of Classification Search
CPC ... B29C 33/02; B29C 33/405; B29C 33/3828; B29C 33/3842; B29C 35/02; B29C 70/54; B29C 2033/385
(Continued)

(56) References Cited

U.S. PATENT DOCUMENTS 3,185,432 A * 5/1965 Hager, Jr. .............. B29C 33/02
249/116
3,827,667 A 8/1974 Lemelson
(Continued)

FOREIGN PATENT DOCUMENTS

CN 101564875 A * 10/2009
CN 101564875 A 10/2009
(Continued)

OTHER PUBLICATIONS

CN101564875A, machine translation via google patents, https://patents.google.com/patent/CN101564875A/en?assignee=inner+mongolia+gongda+boyuan&country=CN, 5 pages. (Year: 2018).*
(Continued)

*Primary Examiner* — Joseph S Del Sole
*Assistant Examiner* — Emmanuel S Luk
(74) *Attorney, Agent, or Firm* — Brooks, Cameron & Huebsch, PLLC

(57) ABSTRACT

A multi-layered composite mold structure (10) is provided. The multi-layered composite mold structure (10) comprises a multi-layered member including (a) at least one metal heating layer (11); (b) at least one metal heat distribution layer (13); (c) at least one laminate composite layer (12); and (d) a surface layer (14). A process for preparing the multi-layered composite mold structure is also provided.

6 Claims, 4 Drawing Sheets

(51) Int. Cl.
    *B29C 35/02*    (2006.01)
    *B29C 33/02*    (2006.01)
    *B29C 33/38*    (2006.01)
    *B29K 101/10*   (2006.01)

(52) U.S. Cl.
    CPC .......... *B29C 33/3842* (2013.01); *B29C 35/02* (2013.01); *B29C 70/54* (2013.01); *B29C 2033/385* (2013.01); *B29K 2101/10* (2013.01); *B29K 2905/00* (2013.01); *B29K 2913/00* (2013.01); *B29K 2995/0013* (2013.01)

(58) Field of Classification Search
    USPC .......................................................... 249/78
    See application file for complete search history.

(56) References Cited

U.S. PATENT DOCUMENTS

| | | | |
|---|---|---|---|
| 4,120,930 A | 10/1978 | Lemelson | |
| 4,563,145 A * | 1/1986 | De Meij | B29C 33/04 249/78 |
| 5,176,839 A * | 1/1993 | Kim | B29C 33/02 249/111 |
| 5,260,014 A | 11/1993 | Holton et al. | |
| 5,388,803 A * | 2/1995 | Baumgartner | B29C 33/42 249/111 |
| 5,431,367 A * | 7/1995 | Baumgartner | B29C 33/56 106/38.2 |
| 5,989,008 A * | 11/1999 | Wytkin | B29C 33/02 249/78 |
| 7,290,751 B2 * | 11/2007 | Chen | B29C 33/56 249/114.1 |
| 8,070,476 B2 * | 12/2011 | Kotaka | B29C 45/2632 249/104 |
| 8,794,950 B2 * | 8/2014 | Feigenblum | B29C 33/06 219/634 |
| 8,931,751 B2 | 1/2015 | Funke et al. | |
| 9,096,009 B2 * | 8/2015 | Anbarasu | B29C 33/04 |
| 9,962,861 B2 * | 5/2018 | Jaderberg | B29C 45/73 |
| 2002/0089016 A1 | 7/2002 | Joly et al. | |
| 2005/0035115 A1 * | 2/2005 | Anderson | B29C 33/04 219/759 |
| 2006/0289293 A1 | 12/2006 | Chen | |
| 2007/0266776 A1 | 11/2007 | Liberatore et al. | |
| 2012/0187273 A1 | 7/2012 | Mironov | |
| 2014/0127345 A1 | 5/2014 | Saeger et al. | |
| 2016/0193752 A1 | 7/2016 | Rajasingam et al. | |

FOREIGN PATENT DOCUMENTS

| | | |
|---|---|---|
| CN | 202480385 U | 10/2012 |
| CN | 103009510 A | 4/2013 |
| CN | 103056788 A | 4/2013 |
| EP | 0335100 A2 | 10/1989 |
| JP | 52257819 A | 11/1987 |
| JP | 5192931 B2 | 5/2013 |
| RU | 126283 | 3/2013 |
| WO | 2009007077 A1 | 1/2009 |
| WO | 2011146995 A1 | 12/2011 |
| WO | 2012086471 | 6/2012 |

OTHER PUBLICATIONS

PCT/CN2013/082531, International Search Report and Written Opinion dated May 21, 2014.
PCT/CN2013/082531, International Preliminary Report on Patentability dated Mar. 10, 2016.
Supplementary European Search Report for EP13892363, dated 2017, pp. 1-2.

* cited by examiner

METHOD FOR PRODUCING NON-METAL SELF-HEATABLE MOLDS

FIELD

The present invention is related to a method for making non-metal molds; and more specifically, the present invention is related to a method of making non-metal molds that provide high surface temperature uniformity when the molds are used for fabricating heat-curable composite parts. The present invention can be used, for example, in processes for manufacturing wind rotor blades, locomotive parts, yacht hulls, airplane wing panels and the like.

BACKGROUND

Heretofore, two types of molds—one mold made of metal and the other mold made of non-metal material—have been used in an infusion/injection molding process for producing fiber-reinforced composite parts such as wind rotor blades or locomotive parts. Molds made of metals such as steel, aluminum, copper or metal alloy, provide superior surface temperature uniformity because of metal molds' higher thermal conductivity, but the metal molds are heavy and thus difficult to handle; and the metal molds of large and complex shapes are expensive to make.

On the other hand, non-metal molds such as fiber-reinforced composite molds are much lighter and can be made faster at lower cost, especially for large and complex geometries. The non-metal molds, however, often suffer from large temperature deviation (e.g., ±10% of average value) across the mold surfaces. The higher the mold temperature, the larger the deviation can occur across the whole mold surface due to, for example, (1) the utilization of resin-based composite materials with inhomogeneous and anisotropic laminate structures, and (2) the non-uniform heat generated by the heating wires in the heating layer. A large temperature deviation often (1) causes "hot-spots (e.g., +10% of average value)/cold-spots (e.g., −10% of average value)" at mold surfaces, (2) leads to large variation in resin viscosity, and (3) affects resin flow, which may cause dry spot formation in the finished parts. In addition, the non-uniform heating of thermoset materials enclosed in the mold may lead to improper curing and cause undesired deformation of the finished parts. A mold that can be used in an infusion/injection molding process for producing fiber-reinforced composite parts without the disadvantages described above would be advantageous in the art.

U.S. Pat. No. 5,260,014 discloses a method of making injection molds suitable for use in injection molding, structural foam molding, low-pressure injection molding, and gas-assisted injection molding of plastic articles. The injection mold contains an electrodeposited thin metal layer on the mold's outer surface, and a rigid thermoset plastic material is cast upon the inner surface of the metal layer for supporting the metal layer. Heat transfer elements are cast within the plastic material and located adjacent to the metal layer to transfer heat for the metal layer and the plastic material. U.S. Pat. No. 5,260,014 also discloses that the thin metal layer is nickel, the plastic material is epoxy, and the heat transfer elements are metal chips and heat transfer tubing. The following features exist in the mold described in the above patent: (1) the metal layer is electrodeposited on a mold blank; (2) the metal layer is deposited on the surface of a finishing mold; (3) the metal layer backing material is formed by casting; and (4) the heating elements are of a spot area type. Molds having the above features may not be suitable for making large area curved molds such as wind rotor blade molds; and, an electrodepositing process is not a cost-effective solution because the process normally involves submerging the part into a container or vessel which holds the coating bath or solution and applying direct current electricity.

U.S. Pat. No. 4,120,930 discloses a mold for shaping a material to be molded, wherein the mold is formed by casting a first mold base portion formed of a bulk material such as Portland cement, carbon, graphite or castable ceramic material and the like to define a mold cavity; and then coating the mold cavity with a first metallic layer. Then a second hard surface layer formed of a material such as the carbides, nitrides, and oxides of tungsten, titanium, boron, silicon and aluminum is deposited on the surface of the metallic first layer. The mold-forming method of the prior art includes forming the mold backing material by casting and the metallic layer is deposited via coating by spraying, electrolytically or electroless depositions in the prior art. Similar to the process of U.S. Pat. No. 5,260,014, the coating technique of the prior art may not be suitable for making large molds to achieve desired thickness tolerance at reasonable cost.

JP62257819A discloses a method for making an injection mold. JP62257819A discloses a casting apparatus for casting fiber reinforced material (FRP) which consists of a male mold and a female mold. The female mold part includes a plastic part with a metal covering layer and pipes through which heating medium flows and the metal covering layer and pipes containing heating medium ensure uniform temperature distribution at the mold surfaces. The mold-making method described in JP62257819A has the disadvantages of: (1) the metal layer used is laid at mold surface which may lead to undesired fast heat loss and early degradation of the metal layer due to chemical erosion and prematurely wearing out; (2) the heating medium only lists fluid heating that involves design, operation and maintenance complexity; and (3) the metal layer is not adapted to a perforated product.

U.S. Pat. No. 3,827,667 discloses a method for making heat transfer panels utilized in large molds. The construction of the panels includes the use of a relatively thin metal sheet or panel in combination with a bulk material such as ceramic material forming the major portion of the mold structure and providing the support for the sheet or panel material. In constructing the panels, a heat transfer passageway is formed within or between the sheet material and the backup material through which heat transfer fluid may be flowed. The prior art also disclosed simple methods for forming the heat transfer molds. The panel-constructing method described in U.S. Pat. No. 3,827,667 has the following disadvantages: (1) the metal sheet or panel is laid on panel surface; (2) the back layer bulk material is ceramics (such materials as Portland cement, various ceramic materials of known compositions which are castable, mortars and cellular plastics, mortars and the like); and (3) the heat transfer passageway is limited to fluid. JP5192931A discloses a method of forming a ceramic or metal layer on the entire surface of or a part of the surface of a mold material made of concrete by flame spraying. The flame spraying, mold-forming method described in JP5192931A has the disadvantages of having to flame-spray the metal layer onto the mold surface; and flame spraying involves melting raw materials to be deposited that produces a large amount of dust and fumes made up of very fine particles. Flame spraying also requires the utilization of spraying equipment and fuel gases. All of the above disadvantages create safety hazards. The complex method disclosed in JP5192931A simply involves an unsafe operation of inserting a metal layer into fabric preforms. In addition, the matrix material of this mold is concrete which is heavy compared to other lighter materials used for fiber reinforced laminates/sandwich structures. The method and mold disclosed in JP5192931A does not contain a heating system; and an external heating device is needed to infuse and cure composites made by the method. Also, a flame-sprayed layer prepared by the above method may be porous; and the porosity of the layer can create a non-uniform temperature distribution across mold surfaces.

WO2009007077A1 discloses an integrally heated ceramic mold for manufacturing polymeric composite materials, and a method of manufacturing such a mold. The mold is suitable for manufacturing relatively large components such as wind turbine blades, and the mold enables the profile of the heat output at a working surface of the mold to be accurately controlled to complement the component being molded. However, WO2009007077A1 has the following disadvantages: (1) the mold body is made from ceramic that is brittle and weak in tension and shearing; and the mold body may also have a porous mold surface; (2) the manufacturing process of the ceramic mold is complex and expensive; and (3) the mold does not incorporate a metal layer to enhance mold surface temperature uniformity.

The prior art references above similarly disclose utilizing a metal/ceramic layer on the outmost mold surface, i.e. above the outmost mold surface layer, in spite of the different materials and fabrication processes introduced. None of the processes of the prior art involves inserting a metal layer beneath the outmost mold surface layer.

SUMMARY

The present invention, as shown schematically in FIG. 1, utilizes a thin layer of high thermal conductivity metal layer embedded between a mold surface layer made of quasi-isotropic laminate material and a heating layer to achieve high temperature uniformity across the mold surface. The metal layer can be made of steel, copper, aluminum or metal alloy in the form of a sheet or a foil; and with or without perforations. The heating layer can include fluid heating, electricity heating or electromagnetic wave heating. Since the thermal conductivity for a metal layer is normally greater than (>) about 200 W/mK for aluminum, which is hundreds of times higher than the thermal conductivity for a cured resin (e.g., about 0.2 W/mK for cured epoxy resin), the higher thermal conductivity of the metal layer assists in achieving thermal equilibrium faster and improves temperature uniformity of mold surface.

The mold design of the present invention has the following advantages: (1) better mold surface temperature uniformity and faster thermal equilibrium which helps avoid localized hot/cold spots on the mold surface and prevents the formation of dry spots in the cured composites; (2) embedding the metal layer beneath an epoxy matrix composite surface layer protects the metal layer from chemical erosion and prevents the metal layer from prematurely wearing out; (3) the composite surface layer also acts as a buffer to reduce heat loss from the mold and has a similar co-efficient of thermal expansion (CTE) as the composite or plastic material being processed; and (4) the mold also consists of backing members below the heating layer in the form of a thick (for improved mold stiffness/rigidity) laminate or a "sandwich" structure to increase the stiffness and dimension stability during heating and cooling of the mold.

In one embodiment, the present invention is directed to a method for making a non-metal mold that provides surface temperature uniformity when the mold is used, for example, for fabricating heat-curable composite parts such as wind rotor blades, locomotive parts, yacht hulls, airplane wing panels and the like. For example, the present invention may be used to improve the temperature distribution of a composite infusion mold. The present invention may also be very effective for use as a light-weight high quality self-heatable tooling in industries like alternative energy, transportation, and consumerism.

The mold of the present invention can be constructed using a variety of materials such as fiber reinforced material (FRP), ceramic, or cement; and the mold has embedded heating elements including, but not limited to, electrical heating and liquid heating elements.

Another embodiment of the present invention is directed to a composite mold structure comprising a layered member including at least one metal heating layer.

Still another embodiment of the present invention is directed to a multilayered composite mold structure comprising a multi-layered member including (a) at least one metal heating layer; (b) at least one laminate composite layer; and (c) a surface layer.

Yet another embodiment of the present invention is directed to a process for preparing the above composite mold structure.

And still another embodiment of the present invention is directed to a cured shaped molded thermoset article prepared by using the above composite mold structure and process.

Compared with the prior art mold designs, the mold structure of the present invention and the fabrication method thereof provides the following advantages: (1) an improved uniformity in molding surface temperature distribution can be obtained that leads to improved quality in the resulting finished composites made in the mold structure of the present invention, (2) when a metal layer is embedded beneath a surface layer, such as an epoxy matrix composite surface layer, the surface layer protects the metal layer from chemical erosion and prevents the metal layer from prematurely wearing out; (3) the composite surface layer can also act as a buffer layer to reduce heat loss from the mold structure and has a similar co-efficient of thermal expansion (CTE) as the composite or plastic material being processed in the mold structure of the present invention; (4) there is no or little addition to the complexity in mold fabrication, (5) a one-shot finishing can be performed, particularly when a permeable heating layer and a metal layer is used, (6) a light weight mold can be manufactured, (7) the mold manufacturing process is friendly, (8) the present invention provides flexibility in selection of the metal layer(s) type and thickness, and (9) the present invention provides fast production of a mold structure at a lower cost, especially for large and complex molds.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION

"Non-metal mold" herein means the utilization of non-metal materials in the construction of the mold main body.

"Self-heatable" herein means heating elements being an integral part of the mold design and fabrication.

"Surface temperature uniformity" herein means the temperature distribution across the mold surface wherein the temperature from one point on the surface to another point on the surface does not vary by more than a certain quantity of degrees; and wherein the temperature difference is not more than 5% (or less than 5%). Surface temperature uniformity can be quantified by measuring the largest temperature variation across the mold surface.

"One-shot finishing" herein means that a whole mold body can be infused and cured simultaneously in one step.

"Permeable heating and metal layer" herein means a perforated, metal layer adapted to being heated and adapted for allowing resin to flow through the perforations of the layer from one side to the other side of the layer. The permeable heating and metal layer is preferably used in a one-shot finishing step of the mold construction process of the present invention.

A broad embodiment of the present invention is directed to providing a composite mold structure comprising a layered member including at least one heating layer and one metal heat distribution layer in one embodiment; and a multilayered composite mold structure comprising a multilayered member including (a) at least one heating layer; (b) at least one metal heat distribution layer; (c) at least one laminate composite layer; and (d) a surface layer in another embodiment.

Figure 1:
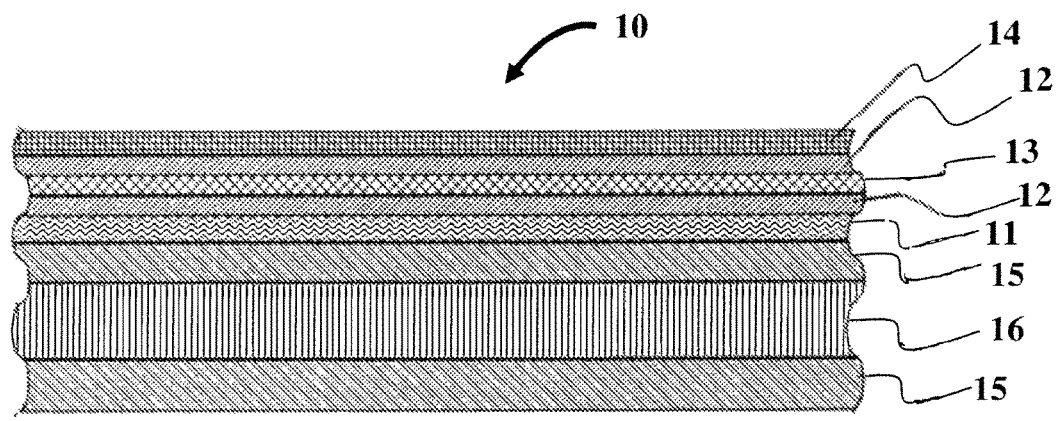
FIG. 1 is a cross-sectional side view of a portion of one embodiment of the present invention showing a multilayered structure of the present invention. The embodiment shown in FIG. 1 is shown as a flat or planar multi-layer geometry such as a sheet, but is not limited thereto. Molds of curved geometries (not shown) are also included in the present invention.

With reference to FIG. 1, there is shown one embodiment of the present invention mold structure comprising a multi-layer composite mold structure in the form of multiple sheet, film or layer members. The multi-layer composite mold structure is indicated by general numeral 10 and includes a heating layer 11 embedded in one or more laminate composite heat transfer layers 12, a metal heat distribution layer 13 and one or more laminate surface layers 14 together with core material layer 16 inserted one or more laminate backing layers 15. The layers are bonded together as shown in FIG. 1 to make up the sheet member or multi-layer composite mold structure 10.

The heating layer 11 of the composite mold structure can be for example a fluid heating layer, an electrical heating layer, or other conventional heating layers known in the art. For example, the fluid of the fluid heating layer can include water, oil or mixtures thereof flowing in a conduit such as pipes embedded in the mold heating layer The electrical heating layer can include, for example, a heating wire, a heating mat, a heating fabric, or other conventional heating structures known in the art. The heating layer 11 of the composite mold structure is used to provide heat to the mold. In one preferred embodiment, the composite mold structure may be heated to a temperature of from about 20° C. to about 300° C., from about 30° C. to about 200° C. in another embodiment, and from about 40° C. to about 150° C. in still another embodiment.

Generally, the heating layer of the composite mold structure may have a thickness of from about 10 microns (μm) to about 30 millimeters (mm) in one embodiment, from 100 μm to about 25 mm in another embodiment, and from about 1 mm to about 20 mm in another embodiment.

The laminate composite heat transfer layer 12 of the composite mold structure is present in the mold structure to provide support, strength, heat transfer and electrical insulation to the mold structure. In one embodiment, the laminate composite heat transfer layer 12 of the composite mold structure can be for example a thermoset-based composite layer such a thermoset composite comprising a reinforced material in a cured resin matrix. For example, the laminate composite heat transfer layer lamina made of fibers, as the reinforcing material, in a cured resin system. The fibers can include for example carbon fiber, glass fibers, basalt fibers, aramid fibers, boron fibers, thermoplastic fibers, or combinations thereof. The resin system may include, for example, a thermosettable material such as an epoxy, a vinyl ester, a polyurethane, a polyimide, a polyamide, a polyester, or combinations thereof.

Generally, the laminate composite heat transfer layer of the composite mold structure may have a thickness of from about 500 μm to about 20 mm in one embodiment, from about 500 μm to about 10 mm in another embodiment, and from about 1 mm to about 5 mm in another embodiment.

In one preferred embodiment, the resin system useful in producing the composite mold structure of the present invention can be, for example, a curable formulation or composition comprising at least one epoxy compound as component (I) and a curing agent as component (II) to form the curable formulation that can be cured to form a thermoset material. For example, the epoxy compound useful in the present invention may include any conventional epoxy compound. In general, the curing agent (also referred to as a hardener or crosslinking agent), component (II), is blended with the epoxy resin compound, component (I), to prepare the curable formulation or composition that is to be cured into a shaped article such as the composite mold structure or any of the layers of the composite mold structure.

One embodiment of the epoxy compound useful in the curable composition of the present invention may be for example a single epoxy compound used alone; or in a combination of two or more epoxy compounds such as any of the epoxy compounds described in Lee, H. and Neville, K., *Handbook of Epoxy Resins*, McGraw-Hill Book Company, New York, 1967, Chapter 2, pages 2-1 to 2-27, incorporated herein by reference. In a preferred embodiment, the epoxy compound may include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy compound may also be selected from commercially available epoxy resin products such as for example, D.E.R. 331®, D.E.R. 332, D.E.R. 354, D.E.R. 580, D.E.N. 425, D.E.N. 431, D.E.N. 438, D.E.R. 736, or D.E.R. 732 epoxy resins available from The Dow Chemical Company.

In general, the curing agent, component (II), blended with the epoxy resin compound, component (I), to prepare the curable composition may comprise, for example, any conventional curing agent known in the art useful for including in a curable composition. The curing agent useful in the curable composition, may be selected, for example, but are not limited to, anhydrides, carboxylic acids, amine compounds, phenolic compounds, or mixtures thereof.

Examples of curing agents useful in the present invention may include any of the co-reactive or catalytic curing materials known to be useful for curing epoxy resin based compositions. Such co-reactive curing agents include, for example, polyamine, polyamide, polyaminoamide, dicyandiamide, polymeric thiol, polycarboxylic acid and anhydride, and any combination thereof or the like. Suitable catalytic curing agents include tertiary amine, quaternary ammonium halide, Lewis acids such as boron trifluoride, and any combination thereof or the like. Other specific examples of co-reactive curing agent include diaminodiphenylsulfone, styrene-maleic acid anhydride (SMA) copolymers; and any combination thereof. Among the conventional co-reactive epoxy curing agents, amines and amino or amido containing resins and phenolics are preferred.

Generally, the amount of the curing agent used in the curable composition of the present invention to prepare a composite may be measured in terms of a ratio of the amount of epoxy compound to the amount of curing agent. For example, the ratio of epoxy compound to curing agent may be from about 100/1 to about 100/1,000 in one embodiment, from about 100/1 to about 100/500 in another embodiment; and from about 100/10 to about 100/200 in still another embodiment, based on the total weight of the curable composition.

Other compounds that may be optionally added to the curable composition may include compounds that are normally used in resin formulations known to those skilled in the art for preparing curable compositions and thermosets. The optional compounds that can be added to the curable composition may include, for example, a cure catalyst to facilitate the reaction of the epoxy resin compound with the curing agent; de-molding agents; other accelerators a solvent to lower the viscosity of the formulation further, other resins such as a phenolic resin that can be blended with the epoxy resin of the formulation, other epoxy resins different from the epoxy compound of the present invention (for example, aromatic and aliphatic glycidyl ethers; cycloaliphatic epoxy resins; and divinylarene dioxides such as divinylbenzene dioxide), other curing agents, fillers, pigments, toughening agents, flow modifiers, adhesion promoters, diluents, stabilizers, plasticizers, catalyst de-activators, flame retardants, defoamer, wetting agent and mixtures thereof.

Generally, the amount of other optional components, when used in the present invention, may be for example, from 0 wt % to about 1,000 wt % in one embodiment, from about 0.01 wt % to about 1,000 wt % in another embodiment; and from about 0.1 wt % to about 100 wt % in still another embodiment.

The process for preparing the curable composition includes admixing (I) at least one epoxy compound; (II) at least one curing agent composition, and (III) optionally, other ingredients as needed. For example, the preparation of the curable resin formulation of the present invention is achieved by blending, in known mixing equipment, the epoxy compound, the curing agent composition, and optionally any other desirable additives.

All the compounds of the curable formulation are typically mixed and dispersed at a temperature enabling the preparation of an effective curable epoxy resin composition having the desired balance of properties for a particular application. For example, the temperature during the mixing of all components may be generally from about −20° C. to about 200° C. in one embodiment, from about 0° C. to about 100° C. in another embodiment, and from about 20° C. to about 80° C. in still another embodiment. A lower mixing temperature helps to minimize reaction of the epoxide and hardener in the composition to maximize the pot life of the composition, but also increases the epoxide and hardener mixture viscosity and decreases the filler loading.

The preparation of the curable formulation, and/or any of the steps thereof, may be a batch or a continuous process. The mixing equipment used in the process may be any vessel and ancillary equipment well known to those skilled in the art.

The process of curing of the curable composition may be carried out by conventional processes well known to those skilled in the art. For example, the curing can be carried out at a predetermined temperature of generally from about 10° C. to about 300° C. in one embodiment; from about 10° C. to about 200° C. in another embodiment; and from about 25° C. to about 150° C. in still another embodiment. The curing can be carried out, for example, for a predetermined period of time of generally from about 1 minute to about 1 week in one embodiment, from about 10 minutes to about 2 days in another embodiment, and from about 1 hour to about 24 hours in still another embodiment. Below a period of time of about 1 minute, the time may be too short to ensure sufficient reaction under conventional processing conditions; and above about 1 week, the time may be too long to be practical or economical.

The metal heat distribution layer 13 of the composite mold structure is present in the mold structure to provide a uniform surface temperature to the mold structure. Advantageously, the mold structure's property related to temperature fluctuation is minimized across the surface of the mold structure. In one preferred embodiment for example, the composite mold structure exhibits a fluctuation in temperature of from about 0° C. to about ±20° C. in one embodiment, from about 0° C. to about ±10° C. in another embodiment, and from about 0° C. to about ±5° C. in another embodiment depending on the set mold temperature.

The metal heat distribution layer 13 of the composite mold structure can be for example steel, aluminum, copper, a metal alloy, or other conventional metals used in manufacturing a mold structure as known in the art.

The metal heat distribution layer 13 may be perforated including mesh type or non-perforated. When the metal heat distribution layer contains perforation, the one or more perforations can be of any size and shape as desired. For example, the shape of the perforations can be round, rectangle, diamond-shaped or any other conventional shape known in the art. When the perforations are one or more round holes or rectangular holes, the diameter of the round hole or the edge width of the rectangular hole can be for example from 200 µm to 5 mm and the hole space can range from about 2 mm to about 50 mm.

Generally, the metal heat distribution layer 13 may have a thickness of from about 10 µm to about 2 mm in one embodiment, from about 50 µm to about 1 mm in another embodiment, and from about 100 µm to about 500 µm in still another embodiment.

The mold surface layer 14 of the composite mold structure is present in the mold structure to provide mechanical properties, chemical resistance, and surface glossiness to the mold structure. The mold surface layer 14 of the composite mold structure can be for example thermoset based laminate layer.

The mold surface layer can include for example a hardened or cured non-woven fiber mat in a thermoset resin. The fiber mat can generally be from about 50 grams per square meter (g/m$^2$) to about 2,000 g/m$^2$ in one embodiment, from about 100 g/m$^2$ to about 1,000 g/m$^2$ in another embodiment, and from 200 g/m$^2$ to about 500 g/m$^2$ in still another embodiment.

Generally, the mold surface layer 14 may have a thickness of from about 50 µm to about 5 mm in one embodiment, from about 200 µm to about 2 mm in another embodiment, and from about 500 µm to about 1 mm in still another embodiment.

The laminate composite backing layer 15 of the composite mold structure is present in the mold structure to provide support, strength and heat conservation to the mold structure. The laminate composite backing layer 15 of the composite mold structure can be for example a thermoset-based composite layer.

For example, the laminate composite backing layer 15 can include lamina made of fibers in a cured resin system. The fibers can include for example carbon fiber, glass fibers, or basalt fiber, aramid fiber, boron fiber, thermoplastic fiber, or combinations thereof. The resin system may include, for example, a thermosettable material such as an epoxy, a vinyl ester, a polyurethane, a polyimide, a polyamide, a polyester, or combinations thereof.

Generally, the laminate composite layer 15, including a sandwich-type construction, may have a thickness of from about 3 mm to about 100 mm in one embodiment, from about 5 mm to about 50 mm in another embodiment, and from about 10 mm to about 20 mm in still another embodiment.

The composite mold structure of the present invention may include a core material layer 16, which can be an optional layer. However, generally the core material layer is preferably used in one preferred embodiment of the composite mold structure. For example, the core material can be used to make a sandwich-type structure wherein the sandwich includes the core material disposed, for example, in-between the heating layer and the backing layer.

The core material layer 16 is useful for increasing the mold panel stiffness, for increasing the heat insulation of the mold structure, and/or for decreasing the weight of the mold structure. Generally, by utilizing a sandwich-type structure for the composite mold structure, the mold panel stiffness of the composite mold structure can be increased from about 2 times to about 100 times in one embodiment, from about 2 times to about 30 times in another embodiment, and from about 2 times to about 10 times in still another embodiment without significantly adding extra weight to the mold. In a preferred embodiment, the mold panel stiffness of the composite mold structure can be increased from about 5 times to about 30 times.

In addition, the heat insulation of the composite mold structure is generally increased from about 2 times to about 100 times in one embodiment, from about 2 times to about 30 times in another embodiment, and from about 2 times to about 10 times in still another embodiment. In a preferred embodiment, the heat insulation of the composite mold structure can be increased from about 5 times to about 30 times.

The composition of the core material can be selected from, for example, a polymer-based foam core, a light weight plant wood material, or other conventional materials known in the art.

Generally, the core layer 16 may have a thickness of from about 2 mm to about 100 mm in one embodiment, from about 5 mm to about 50 mm in another embodiment, and from about 5 mm to about 20 mm in still another embodiment.

The composite mold structure of the present invention may include, as an optional layer, a gel-coat layer which can be used, for example, to increase the mold surface quality of the composite mold structure. For example, the gel-coat layer can be a thermoset or a thermoplastic layer or other conventional materials known in the art.

Generally, the gel-coat layer may have a thickness of from about 100 µm to about 2 mm in one embodiment, from about 200 µm to about 1 mm in another embodiment, and from about 500 µm to about 1 mm in still another embodiment.

The composite mold structure of the present invention may include, as an optional layer, a heat insulation layer to increase the insulation value of the composite mold structure. Most conventional heat insulation materials can be used in the heat insulation layer of the present invention. For example, the insulation layer can be a polymer-based foam, asbestos, or other conventional materials known in the art.

In general, when the heat insulation layer is used in the mold structure, the insulation value of the composite mold structure may be increased by about 100% to about 1,000% in one embodiment.

When the core material is used in a mold sandwich panel of the mold structure, and the thickness of the core material is for example greater than 50 mm, an insulation layer may not be needed. However, when an insulation layer is used, generally, the insulation layer may have a thickness of from about 3 mm to about 50 mm in one embodiment, from about 5 mm to about 20 mm in another embodiment, and from about 10 mm to about 20 mm in another embodiment.

Apart from the most commonly used mold manufacturing process of layer-by-layer casting or laminating, the mold manufacturing process useful in the present invention can also include a step-by-step process, a one-shot vacuum infusion process, or a light Resin Transfer Molding (RTM) process.

One embodiment of the process of manufacturing the composite mold structure of the present invention can include for example a one-shot infusion fabrication process which can include one or more of the following steps:

(1) Applying a thin surface layer to a master mold using a gel-coat or laminate via injection molding;

(2) Laying up a non-woven fiber mat layer adjacent to the layer(s) of step 1 by hand or via an automatic machine;

(3) Laying up perforated metal layer adjacent to the layer(s) of step 2 by hand or via an automatic machine;

(4) Laying up fabric layers adjacent to the layer(s) of step 3 by hand or via an automatic machine;

(5) Laying up perforated heating layers adjacent to the layer(s) of step 4 by hand or via an automatic machine;

(6) Laying up fabric layers adjacent to the layer(s) of step 5 by hand or via an automatic machine;

(7) Laying up a core material layer adjacent to the layer(s) of step 6 by hand or via an automatic machine;

(8) Laying up a fabric layer adjacent to the layer(s) of step 7 by hand or via an automatic machine;

(9) Laying up a release layer adjacent to the layer(s) of step 8 by hand or via an automatic machine;

(10) Laying up a resin flow distribution layer adjacent to the layer(s) of step 9 by hand or via an automatic machine;

(11) Installing a resin flow inlet and an air flow outlet;

(12) Sealing the whole package with vacuum foil;

(13) Impregnating the mold panel preform with epoxy resin system by infusion or an injection process;

(14) Curing the panel of step 13 under room temperature (for example about 25° C.) or at an elevated temperature (for example from about 40° C. to about 200° C.);

(15) Removing the release layer of step 9, the resin flow assist layer of step 10 and resin flow inlet and air flow outlet of step 11 after the mold panel is cured;

(16) De-molding the mold panel from the master mold;

(17) Installing the mold panel to the mold supporting frame; and/or

(18) Post-curing the mold panel with mold heating system.

In the above mentioned one-shot infusion process, steps (2), (4), (7) and (18) are optional steps, and the other remaining steps are useful steps for obtaining further benefits of the present invention. The mold of the present invention can also be manufactured with one or several layers fabricated separately and then assembled together using different joining techniques including, but not limiting to, mechanical techniques such as riveting and bolting; and chemical bonding techniques.

With reference to FIG. 1, there is shown one embodiment of the present invention mold structure which comprises, for example, one or more heating layers 11; one or more laminate composite heat transfer layers 12; one or more metal heat distribution layers 13; one or more laminate surface layers 14; one or more laminate backing layers 15; and one or more core layers 16. The above layers are bonded together to form the multi-layer mold structure of the present invention.

The composite mold structure shows several improved properties over conventional composite mold structures used in mold products. For example, the composite mold structure of the present invention advantageously has better mold surface temperature uniformity and faster thermal equilibrium, good prevention of metal layer from chemical erosion and being worn-out, improved mold panel stiffness and dimension stability during heating and cooling by using a sandwich structure.

The composite mold structure of the present invention, assembled and prepared as described above, may be used for manufacturing a curved or a flat molded article. In one preferred embodiment, the assembled composite mold structure of the present invention is used in manufacturing, for example, light-weight high quality self-heatable tooling in industries like alternative energy, transportation, and consumerism.

The mold structure of the present invention may utilize a thin layer of high thermal conductivity metal layer embedded between a mold surface layer made of quasi-isotropic laminate material and a heating layer to achieve high temperature uniformity across mold surface.

The composite mold structure of the present invention made as described above shows several improved properties over conventional mold structures. For example, the mold structure of the present invention advantageously has better mold surface temperature uniformity and faster thermal equilibrium. In addition, the layers of the mold structure can prevent or minimize the metal layer from chemical erosion and from being worn-out. And, the multi-layered mold structure exhibits increased mold panel stiffness and dimensional stability during heating and cooling, particularly when using a sandwich-type structure.

EXAMPLES

The following examples and comparative examples further illustrate the present invention in detail but are not to be construed to limit the scope thereof.

Example 1 and Comparative Example A

A first multi-layer mold structure was made by the following general process:

(1) Apply a 2 mm thick composite surface layer(s) to a master mold via injection molding;

(2) Apply a heat conductive adhesive layer(s) adjacent to the layer(s) of step (1) with spatula;

(3) Lay up a 1 mm thick aluminum sheet layer(s) adjacent to the layer(s) of step (2) by hand;

(4) Lay up fabric layer(s) adjacent to the layer(s) of step (3) by hand;

(5) Lay up non-woven fiber mat layer(s) adjacent to the layer(s) of step (4) by hand;

(6) Laying up perforated heating layer(s) adjacent to the layer(s) of step (5) by hand;

(7) Lay up fabric layer(s) adjacent to the layer(s) of step (6) by hand;

(8) Lay up perforated foam core material layer(s) adjacent to the layer of step (7) by hand;

(9) Lay up fabric layer(s) adjacent to the layer(s) of step (8) by hand;

(10) Lay up release layer(s) adjacent to the layer(s) of step (9) by hand;

(11) Lay up resin flow distribution layer(s) adjacent to the layer(s) of step (10) by hand;

(12) Install a resin flow inlet above the layer(s) of step (11) and an air flow outlet away from the layer(s) of step (11) but close to the layer(s) of step (10);

(13) Seal the resultant whole package with vacuum foil;

(14) Impregnate the resultant mold panel preform with an epoxy resin system by infusion or an injection process;

(15) Cure the panel of step (14) under room temperature (for example about 25° C.) or at an elevated temperature (for example from about 40° C. to about 80° C.);

to a square or rectangular grid with the distance in the horizontal direction (width) shown by arrows 23, 25 and 27, respectively; and in the vertical direction as shown by arrows 24, 26, and 28, respectively.

Figure 3:
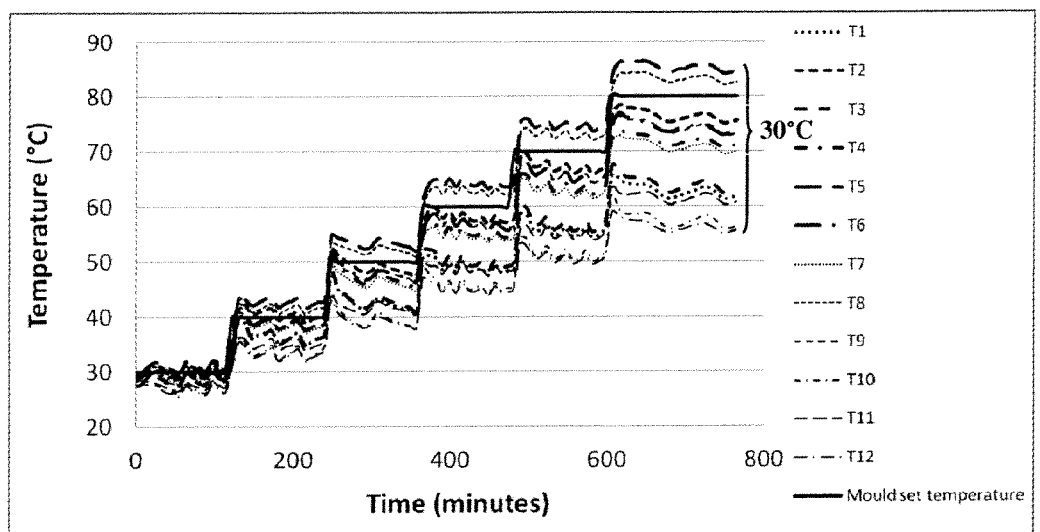
FIG. 3 is a graphical illustration showing the recorded temperature profile of a mold without a metal layer, such as an aluminum layer, implanted in the mold. The temperature of the mold is recorded at the various surface locations of a mold as depicted in FIG. 2.
Figure 4:
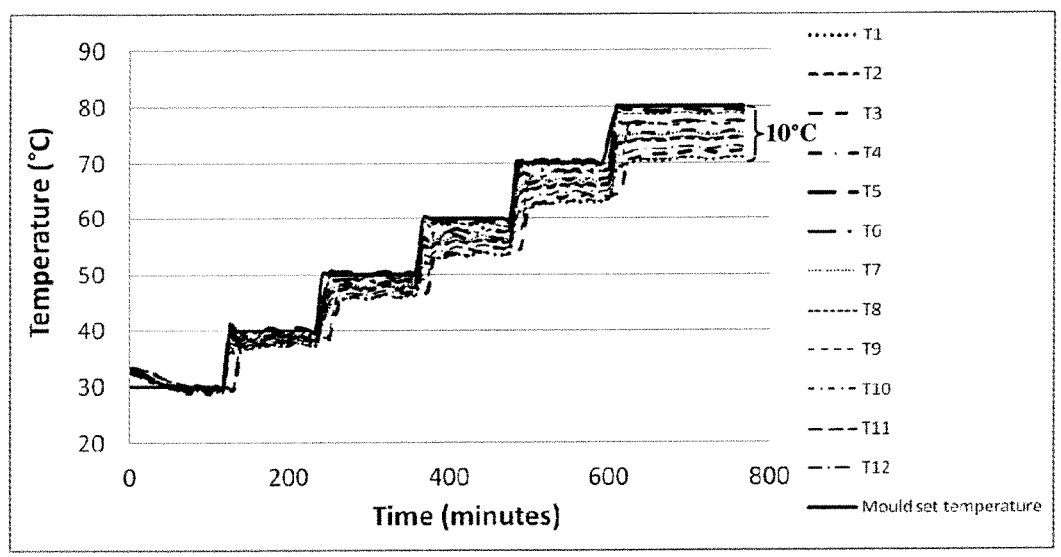
FIG. 4 is a graphical illustration showing the recorded temperature profile of a mold with a metal layer implanted in the mold. The temperature of the mold is recorded at the various surface locations of the mold as depicted in FIG. 2.

The recorded temperature data for the mold without the aluminum layer and the mold with the aluminum layer are given in FIGS. 3 and 4, respectively. In the experimental set up in this Example 1, temperature data are collected using K-type thermocouples.

TABLE I

Resultant Steady State Mold Temperature of Example 1 and Comparative Example A

| | Comparative Example A (mold without aluminum layer) | | Example 1 (mold with aluminum layer) | |
|---|---|---|---|---|
| Mold Set Temperature (° C.) | Maximum Measured Temperature Difference of Mold Surface (° C.) | Time to Reach Steady State | Maximum Measured Temperature Difference of Mold Surface (° C.) | Time to Reach Steady State |
| 30 | 5 | 2 hours | 2 | 1 hour |
| 40 | 10 | 2 hours | 4 | 1 hour |
| 50 | 15 | 2 hours | 6 | 1 hour |
| 60 | 20 | 2 hours | 7 | 1 hour |
| 70 | 25 | 2 hours | 8 | 1 hour |
| 80 | 30 | 2 hours | 10 | 1 hour |

(16) Remove the release layer(s) of step (10), the resin flow assist layer(s) of step (11); and resin flow inlet and air flow outlet of step (12) after the mold panel is cured;

(17) De-mold the mold panel from the master mold;

(18) Install the mold panel to the mold supporting frame; and

(19) Post-cure the mold panel with a mold heating system.

Another second multi-layer mold structure was made the same way as the first mold of Example 1 except that the second mold was made without embedding a 1 mm thick aluminum plate between the mold surface layer and the heating layer (Comparative Example A).

As shown in Table I, the resultant mold with the aluminum plate of Example 1 yielded a greater than 60% improvement on mold surface temperature uniformity for all the tested mold setting temperatures from 30° C. to 80° C. compared to the same mold structure without implanting the aluminum plate (Comparative Example A) under the same boundary conditions (e.g. room temperature where the mold is exposed to and without extra heat insulation layer). In addition, the time for the mold surface in Example 1 to reach a steady state temperature distribution is one hour compared to two hours when using the mold structure of Comparative Example A. "Steady state" herein means mold surface temperature does not change with time. This reduction in time from two hours to one hour was an unexpected result in the present invention.

Figure 2:
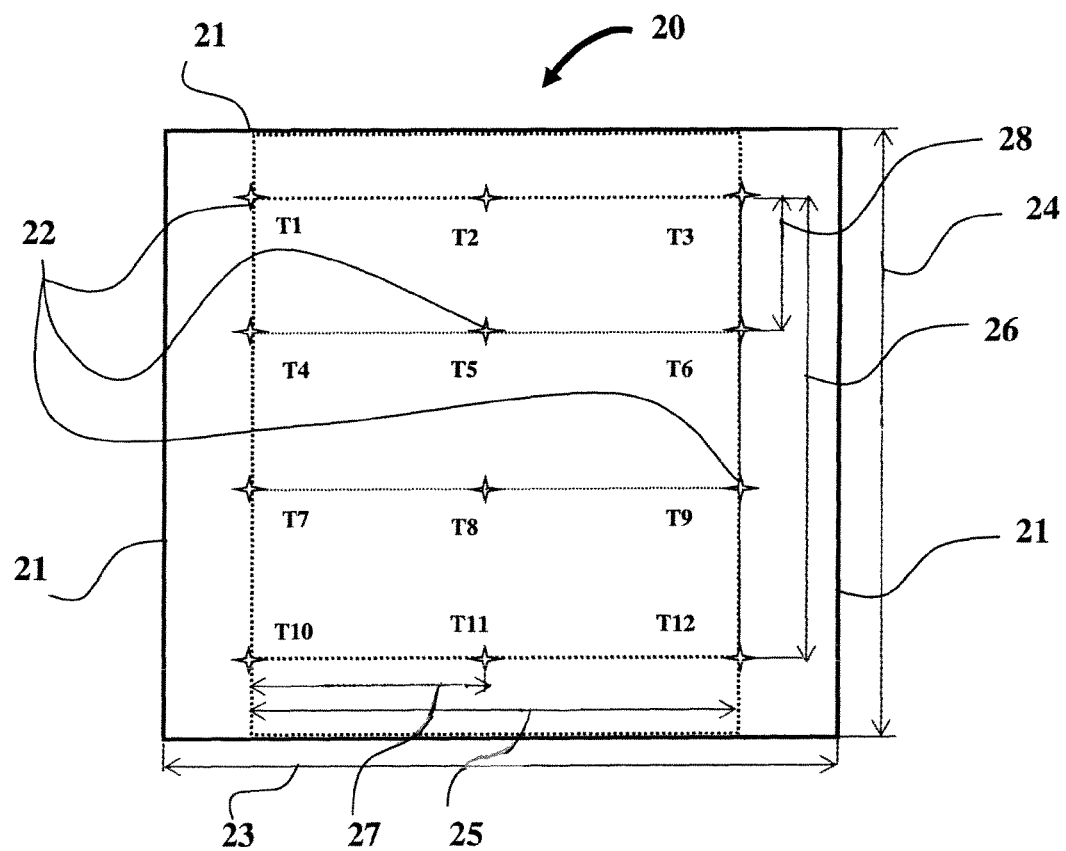
FIG. 2 is a schematic top view of a multilayered mold structure of the present invention showing a layout of a number of thermocouples (T1-T12) attached to the surface of the mold structure at various points of the mold for testing purposes. The setup shown in FIG. 2 is used for collecting temperature data as the temperature response of a mold with and without a metal layer implanted in the mold.

A temperature profile for a mold structure can be obtained by a system, generally indicated by numeral 20, shown in FIG. 2 wherein a mold structure 21 is embedded with a series of thermocouples 22 (T1-T12) for measuring temperature at various locations on the surface of the structure 21. The plurality of thermocouples 22 are spaced uniformly on the structure 21. The layout of the temperature data collection points shown in FIG. 2 can be spaced according

What is claimed is:

1. A composite mold structure comprising a multi-layered member including:
    (a) at least one heating layer;
    (b) at least one metal heat distribution layer;
    (c) at least two laminate composite layer; and
    (d) at least one surface layer comprising a quasi-isotropic laminate material, wherein the at least one metal heat distribution layer is disposed under the surface layer and the at least one metal heat distribution layer distributes heat uniformly throughout the surface layer of the composite mold structure and wherein the at least one heating layer is embedded between at least two said laminate composite layers;

and wherein the surface layer comprises fabric materials impregnated and cured with thermosets or thermoplastic materials.

2. The composite mold structure of claim 1, wherein the at least one heating layer comprises heating wire, heating tube or heating mat encapsulated with cured laminate composite.

3. The composite mold structure of claim 1, wherein the at least one metal heat distribution layer comprises a perforated metal plate, sheet, foil or combination thereof or a non-perforated metal plate, sheet, foil or combination thereof.

4. The composite mold structure of claim 3, wherein metal plate, sheet, foil or combination thereof comprises steel, cooper, aluminum or metal alloys.

5. The composite mold structure of claim 3, wherein the perforated metal layer is a mesh type metal layer.

6. The composite mold structure of claim 1, wherein at least one of the laminate composite layer comprises fiber or fabric materials impregnated and cured with thermosets or thermoplastic materials.

* * * * *